United States Patent Office 3,172,935
Patented Mar. 9, 1965

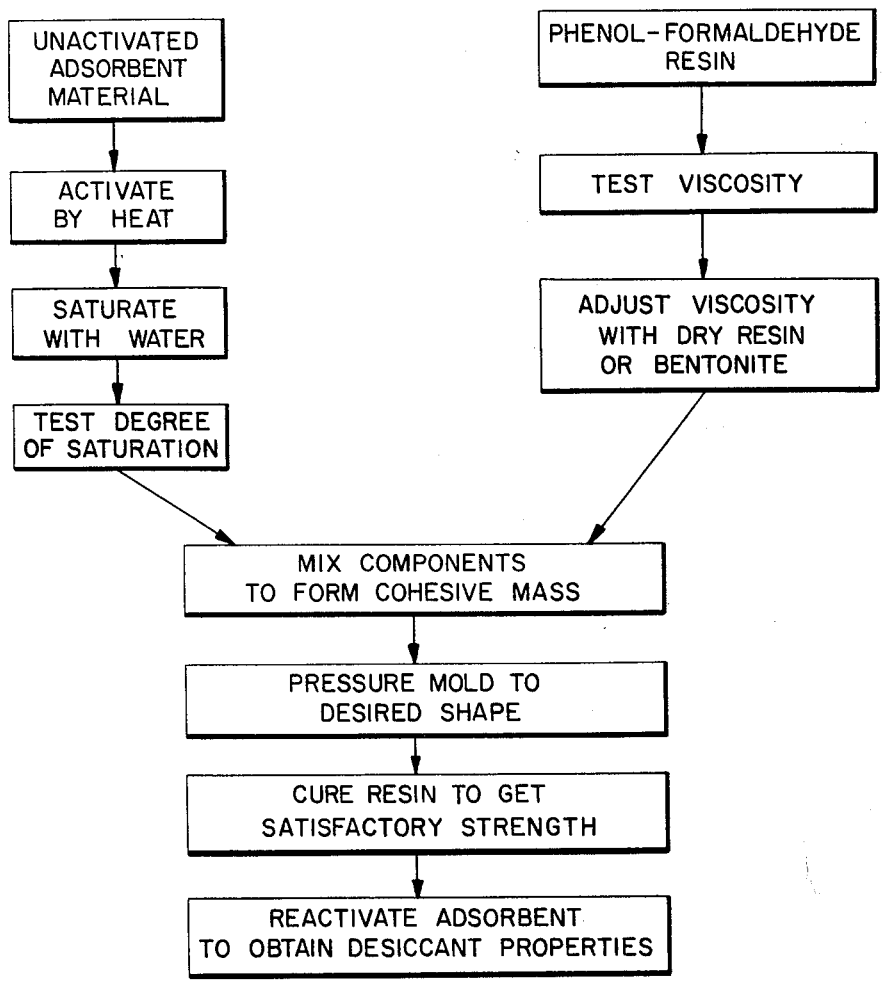

3,172,935
BONDING OF ADSORBENT MATERIALS
John E. Hoffman, Webster Groves, Mo., assignor to Sporlan Valve Company, St. Louis, Mo., a corporation of Missouri
Filed Sept. 5, 1961, Ser. No. 135,748
17 Claims. (Cl. 264—331)

This invention relates generally to the bonding of adsorbent materials, and more particularly relates to the method of manufacturing compositions of matter and to certain products which may be made from the compositions.

The desirability of bonding adsorbents for filtering and drying purposes has heretofore been appreciated since it avoids the objections to adsorbents in unconsolidated form. It will be apparent that adsorbents in unconsolidated form tend to develop channels, that attrition between the individual granules occurs, and that classification of the granules and stratification of the adsorbent bed takes place.

The bonding of discrete particles of adsorbent materials presents a serious problem in that the bonding medium must not close the pore openings of the adsorbent. It is an important objective to solve this problem, thus enabling the consolidation of the particles of adsorbent material into unitary masses, such as molded blocks, without detriment to the micro-structure.

Another important objective of this invention is to provide a new composition of matter capable of various uses. While the material may find application in various industrial fields, it is especially effective as a filter and desiccant for the physical and chemical removal of undesirable substances from fluids.

Still another important object is realized by the development of an economical process for the manufacturing of such material and the articles formed from the material.

It is an important objective to provide a filter block that may be readily utilized in refrigeration systems to remove foreign matter, moisture, oil contamination, sludge and acid from the refrigerant and refrigerant oil. Such filter blocks made up in accordance with this invention stand up remarkably well under severe operating conditions, are very resistant to breakage, and do not present any substantial resistance to the fluid flow therethrough.

Another important objective is to prepare a filter block made of desiccant materials with a bonding agent that results in a porous strong block, the composition being easy to handle in the manufacture of such block. The use of a phenol-formaldehyde resin solution as the bonding agent results in a block with a strength of one and one-half to two times that obtainable by conventional inorganic bonding agents. Because of this strong nature of the bond, a block can be prepared with a lower density and therefore more porosity than is possible with conventional inorganic bonding agents.

Yet another important objective is achieved by a filter block that has the ability to collect a large amount of dirt without excessive pressure drop because the block is very porous and enables the dirt to be collected on the interior surface as well as the exterior surface. A block molded with the phenol-formaldehyde resin solution uses approximately one-half the amount of bonding agent than would be used if an inorganic bond were utilized, and yet has twice the strength and will collect twice as much dirt in standard filtration tests. With an inorganic bond, a greater density is required in order to obtain a satisfactory final strength, and this greater density reduces the filtration ability of the molded block.

A further important advantage of the phenol-formaldehyde resin solution as compared to other organic bonding agents, is that it will withstand high temperatures without excessive decomposition. This feature permits a final activation at atmospheric pressure at temperatures as high as 550 degrees F. to 600 degrees F. in order to assure complete activation of the desiccant. Many other organic materials would decompose at this temperature and would require the use of a lower temperature and/or vacuum equipment.

The above mentioned important advantages afforded by the use of phenol-formaldehyde resin solution are obtained without any sacrifice in the water or acid pickup properties of the desiccant. Moreover, the phenolic resin does not cause any undesirable chemical reactions with the oil or refrigerant present in the refrigeration system. In addition, the phenolic resin bond is stable for several months which is not the case with certain inorganic bonding agents.

A further important advantage of the material made with the phenol-formaldehyde resin solution is that it can be molded by pressure molding techniques and does not require being supported in a mold while being cured. For example, a weighed amount of material is placed in a cylinder and pressure-molded by rams from either end. This block is then ejected from the mold and removed. The block has sufficient wet strength to maintain a shape and is satisfactory for handling, thereby enabling the block to be placed in an oven for curing to reach its final strength.

An important objective is achieved in that the resin solution can be conditioned to bring it within an acceptable viscosity range by mixing it with an additive selected from a group consisting of dry powdered phenolic resin or bentonite prior to the mixing of such solution with the saturated inorganic adsorbent material.

Another important advantage is realized in that the nature of the mixture can be varied to meet the manufacturing process involved, whereby to facilitate ease of handling. By adding bentonite to the mix, the character of the mix can be changed so that it has a greater wet strength enabling the material to be pre-molded into a slug before placement into the final mold. The advantage in pre-molding is that by low pressure forming to the approximate shape desired, a better distribution of material can be obtained in the block and a more uniform density can be obtained in the final product. The addition of bentonite does not appreciably affect the other characteristics of the material.

The invention relates to a process for making molded blocks for use in filter dryers on refrigeration systems, and more specifically, relates to the making of blocks molded from inorganic adsorbent materials and using a phenol-formaldehyde resin solution as the bonding agent. In order to handle the bonding of such desiccant materials and in order to get a strong porous filter block of controlled density, the inorganic adsorbent materials must be specially treated before and after mixing with the bonding agent.

To accomplish the above mentioned objects and others which will hereinafter more fully appear, the invention in general embraces the concept of effectively bonding discrete particles of an adsorbent material in such a manner that the adsorptive efficiency of such particles is not appreciably impaired. Specifically, the finished product consists of particles of an inorganic adsorbent material bonded together to provide a single unit in which the material and bonding medium provide a multiplicity of cells affording a large surface area.

The drawing illustrates a block diagram of the process.

In the preferred method of manufacturing a filter block, the inorganic adsorbent material is activated and then saturated to the saturated state defined hereinafter. This saturated material is then mixed with a phenol-formaldehyde resin solution, and the mixture is molded into a block of the desired shape and form. After molding the block is cured and then reactivated.

Extensive research and experimental work indicates that the molded filter and desiccant structure has an excellent strength when the saturated inorganic adsorbent material is mixed with about 5% (five percent) to about 16% (sixteen percent) phenol-formaldehyde resin solution by weight. In the process of forming the molded, porous filter block, the inorganic adsorbent material, if not already activated, is activated at about 350 degrees F. to about 850 degrees F. before the material is saturated and mixed with the phenol-formaldehyde resin solution. After the mixture has been molded into a block, the block is cured at about 250 degrees F. to about 550 degrees F. to reach its final strength, and then the cured block is reactivated at about 300 degrees F. to about 600 degrees F.

Any suitable inorganic adsorbent material may be used, as for example alumina hydrate, silica gel, calcium sulphate, fuller's earth, and adsorbent zeolites containing sodium or calcium alumino silicate such as molecular sieve. Variations in the desiccant material can be made. For example, various blends of the desiccant material can be used. Any of the inorganic adsorbent materials can be used as long as they are molded in the "saturated state" (that is saturated within a range later defined) and not in the activated state. However, it will be noted that the desiccant does not have to be completely activated before being saturated nor does the desiccant have to be completely saturated.

Moreover, it will be understood that some of the inorganic adsorbent materials such as molecular sieve are available on the market in an activated condition. Under these circumstances, the previously described first step of activation is eliminated, and the material is first saturated to the degree defined below.

The degree of saturation of the desiccant is important because this is the means for controlling the degree of penetration of the resin into the desiccant particles. If the desiccant is not sufficiently saturated, or in other words is still too highly activated, then the resin is absorbed by the desiccant, penetrates into the particles and results in a dry mix that does not go through a cohesive stage while mixed in the muller. This material cannot be molded. On the other hand, difficulty is also encountered if excess water is added beyond the slightly moist condition, which is defined later, because then the desiccant does not absorb enough of the resin to bind the particles satisfactorily.

The slightly moist condition is defined as that condition in which the saturated material just starts to cake but before the material actually cakes.

The degree of saturation of the desiccant can be tested by taking 100 (one hundred) grams of the desiccant and adding water to it until the slightly moist condition is reached. The amount of water required to reach this slightly moist condition will vary according to the degree of saturation of the desiccant. If the desiccant has been previously saturated until slightly moist, then obviously no water would be required in this test in order to reach the slightly moist condition. On the other hand, if a highly activated desiccant were tested, it may require 30 (thirty) grams or more of water to get the slightly moist condition with the 100 (one hundred) grams of desiccant in this test. The water is simply added to the desiccant and mixed by hand until a slightly moist condition is obtained. The slightly moist condition can be easily judged by sight and by feel.

By way of example, an inorganic adsorbent material such as alumina hydrate can be used to make clear what is meant by the "saturated state." The hydrate as produced contains 33% (thirty-three percent) molecular water which is chemically bound in the crystal. In the initial activation most of this water is driven off, resulting in an activated desiccant containing about 8% (eight percent) to about 10% (ten percent) molecular water. As taught by the present disclosure, this activated alumina is then saturated with water. Water equivalent to about 12% (twelve percent) to about 24% (twenty-four percent) of the weight of the activated alumina is added. When 24% (twenty-four percent) water is added, the resulting material is slightly moist according to the above definition. When about 12% (twelve percent) water is added, the resulting material when tested as described above requires about 12 (twelve) grams of water per 100 (one hundred) grams of saturated material to obtain the slightly moist condition. Activated alumina when saturated in this range will mold satisfactorily.

Other desiccants may require a different amount of water to be added to the activated desiccant in order to get to the saturated state. For example, molecular sieve requires over 30% (thirty percent) water to be added to the activated material because it is a desiccant with a higher moisture capacity. Nevertheless, because the critical factor is the amount of penetration of the resin, the saturated state of any desiccant can be defined in the same manner.

Therefore, the "saturated state" for the inorganic adsorbent material can be defined as that state in which the material is saturated so that when 100 (one hundred) grams of the saturated material is tested by adding water to it until a slightly moist condition is realized, the amount of water required is in the range of 0 (zero) grams to about 12 (twelve) grams per 100 (one hundred) grams of saturated desiccant. Another rewording of this definition would be that the "saturated state" of the inorganic adsorbent material can be defined as a desiccant saturated to such a degree that when a portion of the resulting saturated desiccant is tested by adding water to it until the slightly moist condition is obtained, the amount of water required in this addition is in the range of 0 (zero) grams to about 12 (twelve) grams per 100 (one hundred) grams of saturated desiccant being tested.

This means that the activated adsorbent material is saturated to a state in which it takes about 12 (twelve) grams or less of water per 100 (one hundred) grams of saturated material to make such saturated material slightly moist.

While water is normally used for saturating the desiccant, the above definition is to be construed to include the possibility of saturating the desiccant with some material other than water. Anything which the desiccant will absorb and thereby reduce its ability to absorb resin in the mixing operation will serve to control the penetration of the resin. Therefore, the above definition is not written to state that the desiccant is saturated with water but that it is saturated to such a degree that when tested in a standard method with water it falls within certain limits.

The fact that alumina has been pre-activated and saturated to the state defined is extremely important in the disclosed process. A temperature in the range of about 650 degrees F. to about 850 degrees F. is required for the initial activation of alumina hydrate, but once activated, the alumina can be reactivated at temperatures in the range of about 300 degrees F. to about 600 degrees F. Therefore, it is very desirable to bond a material that has been activated and saturated rather than the alumina hydrate because the reactivation of the block can be accomplished at the lower range of temperatures which does not have any adverse effect on the bonding agent.

After the inorganic adsorbent material has been activated and subsequently saturated to the state defined, the phenol-formaldehyde resin solution is added and the mixture is mixed and aged until the proper consistency is obtained. At first, the mix is adhesive and sticky, but as the mixing continues, solvent from the resin solution is evaporated and the mix becomes stiffer, eventually resulting in a cohesive mix with considerably less adhesive properties than the original material. If the material is not mixed long enough, it is too adhesive and sticks to the mold, and has poor wet strength.

A phenol-formaldehyde resin solution of the proper viscosity to form a gluey mix and one that evaporates at a suitable rate to result in a mix that is easy to handle is needed.

A suitable resin solution called Monsanto Resinox 594 is sold by the Monsanto Chemical Company of St. Louis, Missouri. This particular phenol-formaldehyde resin solution is in an alcohol base solvent, contains 63% (sixty-three percent) to 67% (sixty-seven percent) resin solids and 11% (eleven percent) to 17% (seventeen percent) water and has a viscosity at 25 degrees C. in range of 400 (four hundred) to 1,000 (one thousand) centipoises.

The use of dry phenolic resin and various solvents in the mix does not give a satisfactory product. Apparently the use of dry resin does not result in thorough mixing or wetting of the desiccant granules and the resulting material has poor strength.

In most commercial resin solutions, the resins are normally dissolved in a solvent of ethyl alcohol having about 2% (two percent) to about 18% (eighteen percent) water. Methol alcohol is not normally used because it is more poisonous and causes health problems. Ketone solvents could be used but are more expensive. Most resin solutions can also contain some free formaldehyde, with a maximum being 3% (three percent) or sometimes 5% (five percent).

From the standpoint of molding filter blocks, the critical factors are the viscosity and the evaporation rate of the resin solution. The solids content of the resin solution and the degree of polymerization of the resin must be sufficiently advanced to obtain a resin solution of a relatively high viscosity, in a range of about 400 (four hundred) to about 20,000 (twenty thousand) centipoises (Ostwald).

The evaporation rate of the resin solution becomes important as thet alcohol content of the solvent system rises. Too high a percentage of alcohol results in a resin solution in which the solvent evaporates too rapidly, giving a dry sandy material rather than a sticky cohesive material.

The phenol-formaldehyde resin solution suitable in the present process contains 45% (forty-five percent) or more solids and is sufficiently polymerized (three to eight phenol groups per chain) to yield a resin solution with a viscosity in the range of about 400 (four hundred) to about 20,000 (twenty thousand) centipoises (Ostwald). This resin is dissolved in an alcohol and/or ketone and/or water solvent system so as to obtain a suitable evaporation rate when mixed with the saturated inorganic adsorbent material. A resin solution with a suitable evaporation rate is one which when mixed with the saturated inorganic adsorbent material will form a sandy cohesive mass when mixed for a period of a few minutes up to several hours.

A resin solution that does not fall within the viscosity range of about 400 (four hundred) to about 20,000 (twenty thousand) centipoises (Ostwald) can be conditioned prior to mixing with the saturated adsorbent material. It has been found that either dry powdered phenolic resin or bentonite can constitute an additive to increase the viscosity of the resin solution.

Any type of dry phenol-formaldehyde resin powder will serve for increasing the viscosity of a resin solution. The dry powder could be a "one stage" resin with an excess of formaldehyde or a "two stage" resin with an excess of phenol and an appropriate cross-linking agent.

In making phenol-formaldehyde resins, the components are reacted in a water solution with an excess of formaldehyde and using sodium hydroxite as a catalyst. Normally, one phenol is reacted with 3.5 mols of formaldehyde. The resin product containing an excess of formaldehyde is known as a "one stage" resin because further heat will completely polymerize it using the formaldehyde molecule to cross-link and add on to the phenol molecules.

A "two stage" resin is made by using lump novolak base resin containing an excess of phenol and then mixing this with a cross-linking agent such as hexamethylene tetramine. This gives a resin which will cure upon the addition of further heat. An example formulation of about 80% (eighty percent) (varies in the range of about 75% to about 85%) lump novolak base, about 17% (seventeen percent) hexamethylene tetramine and about 2% (two percent) to about 4% (four percent) metallic stearate (calcium) used as a mold release agent. Because it contains all of the necessary agents, this is a complete resin compound. A phenolic molding powder consists of about 40% (forty percent) "one-stage" resin and the remainder is wood, flour, ground fiberglass or some other diluent.

The desiccant-resin mixture is normally pressure-molded, but could also be blow-molded, shell-molded or molded by conventional foundry techniques. The resin in the molded block can be cured in the temperature range of about 250 degrees F. to about 550 degrees F. The curing is a function of time and temperature so that the use of a higher temperature for a shorter time results in an equivalent degree of cure.

To illustrate the principle of the invention, a specific example is now described. First, a quantity of alumina hydrate is activated for about four hours in the temperature range of about 650 degrees F. Then water is added to saturate this material, the amount of water being equal to 20% (twenty percent) of the weight of the activated alumina. To provide a blend of the inorganic adsorbent material, a quantity of molecular sieve, distributed and sold in an activated condition, is saturated with 31% (thirty-one percent) water by weight. 5,290 (five thousand two hundred and ninety) grams of saturated alumina are mixed with 450 (four hundred and fifty) grams of saturated molecular sieve, and this resulting inorganic adsorbent material is mixed with 640 (six hundred and forty) grams of phenol-formaldehyde resin solution of the type called Monsanto Resinox 594 mentioned previously. This mixture is then mixed until a sandy cohesive mass is realized.

The mixture is then molded into blocks and the blocks cured for one hour in an oven at a temperature of 350 degrees F. The cured blocks are then reactivated for approximately four to eight hours at about 500 degrees F. The final activation can be accomplished either before or after the blocks are assembled in the steel drier shell.

The mixture obtained with inorganic adsorbent material and phenol-formaldehyde resin solution is mixed to the point where it is a relatively sandy cohesive material which will flow sufficiently well for automatic weighing and handling equipment. By the addition of about up to 2% (two percent) bentonite by weight to the mix, the character of the mix can be changed to a tacky or gluey mass which would not be suitable for automatic weighing, but does have greater wet strength and therefore could be pre-molded into a slug before putting into the final mold. The advantage in pre-molding is that by low pressure forming to the approximate shape desired, a better distribution of material can be obtained in the block and more uniform density can be obtained in the final product.

It will be apparent that the phenol-formaldehyde resin solution used in this example could be of the type conditioned as described previously by the addition of a dry powdered resin or bentonite to adjust the viscosity within the stated viscosity range prior to mixing with the inorganic adsorbent material.

To form a molded filter block using bentonite in the mix of resin solution and saturated adsorbent material, in a specific example, the activated inorganic adsorbent material is saturated to the state defined and is then mixed with about 5% (five percent) to about 16% (sixteen percent) phenol-formaldehyde resin solution by weight and with up to about 2% (two percent) bentonite by weight to form a tacky mass. The tacky mass is then molded into a block and cured at about 250 degrees F. to about 550 degrees F. After curing, the block is reactivated at about 300 degrees F. to about 600 degrees F.

In the specific example given previously, 30 (thirty) grams of bentonite is added to the mixture in order to give the described results. In the specific example, approximately 10% (ten percent) of phenol-formaldehyde resin solution by weight and approximately ½ (one-half) of 1% (one percent) of bentonite by weight, is used. Of course, it is understood that in the specific example set forth, that the precise ingredients mentioned, their respective amounts, the sequence of steps, and temperatures and times set forth may be varied within relatively wide limits to meet certain conditions.

While for the purposes of clarity, the foregoing specification sets forth certain materials, quantities, steps in the process, and uses of the product, it is of course obvious that various departures may be made therefrom without exceeding the bounds of the invention, and therefore the true scope of the invention is defined solely by the scope of the appended claims.

I claim as my invention:

1. Process of forming a molded porous filter block which comprises the steps of saturating activated inorganic adsorbent material to a state in which it takes about 12 (twelve) grams or less of water per 100 (one hundred) grams of saturated material to make such saturated material slightly moist, mixing the saturated material with a phenol-formaldehyde resin solution, molding the mixture into a block, curing the block, and then reactivating the cured block.

2. Process of forming a molded, porous filter block which comprises the steps of saturating activated inorganic adsorbent material to a state in which it takes about 12 (twelve) grams or less of water per 100 (one hundred) grams of saturated material to make such saturated material slightly moist, mixing the saturated material with about 5% (five percent) to about 16% (sixteen percent) phenol-formaldehyde resin solution by weight, molding the mixture into a block, curing the block, and then reactivating the cured block.

3. Process of forming a molded, porous filter block which comprises the steps of saturating activated inorganic adsorbent material to a state in which it takes about 12 (twelve) grams or less of water per 100 (one hundred) grams of saturated material to make such saturated material slightly moist, mixing the saturated material with a phenol-formaldehyde resin solution, molding the mixture into a block, curing the block at about 250 degrees F. to about 550 degrees F., and then reactivating the cured block at about 300 degrees F. to about 600 degrees F.

4. Process of forming a molded, porous filter block which comprises the steps of saturating activated inorganic adsorbent material to a state in which it takes about 12 (twelve) grams or less of water per 100 (one hundred) grams of saturated material to make such saturated material slightly moist, mixing the saturated material with about 5% (five percent) to about 16% (sixteen percent) phenol-formaldehyde resin solution by weight, molding the mixture into a block, curing the block at about 250 degrees F. to about 550 degrees F., and then reactivating the cured block at about 300 degrees F. to about 600 degrees F.

5. Process of forming a molded, porous filter block which comprises the steps of saturating activated inorganic adsorbent material to a state in which it takes about 12 (twelve) grams or less of water per 100 (one hundred) grams of saturated material to make such saturated material slightly moist, mixing the saturated material with a phenol-formaldehyde resin solution, said phenol-formaldehyde resin solution having a viscosity in the range of about (400 (hundred) to about 20,000 (twenty thousand) centipoises (Ostwald) to obtain an evaporation rate so that the solution and saturated material will form a sandy cohesive mass when mixed, molding the mixture into a block, curing the block, and reactivating the cured block.

6. Process of forming a molded, porous filter block which comprises the steps of saturating activated inorganic adsorbent material to a state in which it takes about 12 (twelve) grams or less of water per 100 (one hundred) grams of saturated material to make such saturated material slightly moist, mixing the saturated material with about 5% (five percent) to about 16% (sixteen percent) phenol-formaldehyde resin solution by weight, the phenol-formaldehyde resin solution having about 45% (forty-five percent) or more solids and having a viscosity in a range of about 400 (four hundred) to about 20,000 (twenty thousand) centipoises (Ostwald) to obtain an evaporation rate so that the solution and saturated material will form a sandy cohesive mass when mixed, molding the mixture into a block, curing the block, and reactivating the cured block.

7. Process of forming a molded, porous filter block which comprises the steps of saturating activated inorganic adsorbent material to a state in which it takes about 12 (twelve) grams or less of water per 100 (one hundred) grams of saturated material to make such saturated material slightly moist, mixing the saturated material with a phenol-formaldehyde resin solution, the phenol-formaldehyde resin solution having about 45% (forty-five percent) or more solids and having a viscosity in a range of about 400 (four hundred) to about 20,000 (twenty thousand) centipoises (Ostwald) to obtain an evaporation rate so that the solution and saturated material will form a sandy cohesive mass when mixed, molding the mixture into a block, curing the block at about 250 degrees F. to about 550 degrees F., and reactivating the cured block at about 300 degrees F., to about 600 degrees F.

8. Process of forming a molded, porous filter block which comprises the steps of saturating activated inorganic adsorbent material to a state in which it takes about 12 (twelve) grams or less of water per 100 (one hundred) grams of saturated material to make such saturated material slightly moist, mixing the saturated material with about 5% (five percent) to about 16% (sixteen percent) phenol-formaldehyde resin solution by weight, the phenol-formaldehyde resin solution having about 45% (forty-five percent) or more solids and having a viscosity in a range of about 400 (four hundred) to about 20,000 (twenty thousand) centipoises (Ostwald) to obtain an evaporation rate so that the solution and saturated material will form a sandy cohesive mass when mixed, molding the mixture into a block, curing the block at about 250 degrees F. to about 550 degrees F., and reactivating the cured block at about 300 degrees F., to about 600 degrees F.

9. Process of forming a molded, porous filter block which comprises the steps of saturating activated inorganic adsorbent material to a state in which it takes about 12 (twelve) grams or less of water per 100 (one hundred) grams of saturated material to make such saturated material slightly moist, mixing the saturated material with a phenol-formaldehyde resin solution and with bentonite to form a tacky mass, molding the tacky mass into a block, curing the block, and then reactivating the cured block.

10. Process of forming a molded, porous filter block which comprises the steps of saturating activated inorganic adsorbent material to a state in which it takes about 12 (twelve) grams or less of water per 100 (one hundred) grams of saturated material to make such saturated material slightly moist, mixing the saturated material with about 5% (five percent) to about 16%

(sixteen percent) phenol-formaldehyde resin solution by weight and with up to about 2% (two percent) bentonite by weight to form a tacky mass, molding the tacky mass into a block, curing the block, and then reactivating the cured block.

11. Process of forming a molded, porous filter block which comprises the steps of saturating activated inorganic adsorbent material to a state in which it takes about 12 (twelve) grams or less of water per 100 (one hundred) grams of saturated material to make such saturated material slightly moist, mixing the saturated material with a phenol-formaldehyde resin solution and with bentonite to form a tacky mass, molding the tacky mass into a block, curing the block at about 250 degrees F. to about 550 degrees F., and then reactivating the cured block at about 300 degrees F. to about 600 degrees F.

12. Process of forming a molded, porous filter block which comprises the steps of saturating activated inorganic adsorbent material to a state in which it takes about 12 (twelve) grams or less of water per 100 (one hundred) grams of saturated material to make such saturated material slightly moist, mixing the saturated material with about 5% (five percent) to about 16% (sixteen percent) phenol-formaldehyde resin solution by weight and with up to about 2% (two percent) bentonite by weight to form a tacky mass, molding the tacky mass into a block, curing the block at about 250 degrees F. to about 550 degrees F., and reactivating the cured block at about 350 degrees F. to about 600 degrees F.

13. Process of forming a molded, porous filter block which comprises the steps of saturating activated inorganic adsorbent material to a state in which it takes about 12 (twelve) grams or less of water per 100 (one hundred) grams of saturated material to make such saturated material slightly moist, mixing the saturated material with a phenol-formaldehyde resin solution and with bentonite to form a tacky mass, the phenol-formaldehyde resin solution having a viscosity in the range of about 400 (four hundred) to about 20,000 (twenty thousand) centipoises (Ostwald), molding the tacky mass into a block, curing the block, and reactivating the cured block.

14. Process of forming a molded, porous filter block which comprises the steps of saturating the activated material to a state in which it takes about 12 (twelve) grams or less of water per 100 (one hundred) grams of saturated material to make such saturated material slightly moist, mixing the saturated material with about 5% (five percent) to about 16% (sixteen percent) phenol-formaldehyde resin solution by weight with up to about 2% (two percent) bentonite by weight, the phenol-formaldehyde resin solution having a viscosity in the range of about 400 (four hundred) to about 20,000 (twenty thousand) centipoises (Ostwald), molding the tacky mass into a block, curing the block, and reactivating the cured block.

15. Process of forming a molded, porous filter block which comprises the steps of saturating activated inorganic adsorbent material to a state in which it takes about 12 (twelve) grams or less of water per 100 (one hundred) grams of saturated material to make such saturated material slightly moist, mixing the saturated material with a phenol-formaldehyde resin solution and with bentonite to form a tacky mass, the phenol-formaldehyde resin solution having a viscosity in the range of about 400 (four hundred) to about 20,000 (twenty thousand) centipoises (Ostwald), molding the tacky mass into a block, curing the block at about 250 degrees F. to about 550 degrees F., and reactivating the cured block at about 300 degrees F. to about 600 degrees F.

16. Process of forming a molded, porous filter block which comprises the steps of saturating activated inorganic adsorbent material to a state in which it takes about 12 (twelve) grams or less of water per 100 (one hundred) grams of saturated material to make such saturated material slightly moist, mixing the saturated material with about 5% (five percent) to about 16% (sixteen percent) phenol-formaldehyde resin solution by weight and with up to about 2% (two percent) bentonite by weight to form a tacky mass, the phenol-formaldehyde resin solution having a viscosity in the range of about 400 (four hundred) to about 20,000 (twenty thousand) centipoises (Ostwald), molding the tacky mass into a block, curing the block at about 250 degrees F. to about 550 degrees F., and reactivating the cured block at about 300 degrees F. to about 600 degrees F.

17. Process of forming a molded, porous filter block which comprises the steps of saturating activated inorganic adsorbent material to a state in which it takes about 12 (twelve) grams or less water per 100 (one hundred) grams of saturated material to make such saturated material slightly moist, mixing the saturated material with a phenol-formaldehyde resin solution, said phenol-formaldehyde resin solution being conditioned prior to mixing by an additive selected from a group consisting of dry powdered phenolic resin and bentonite so as to provide a viscosity in the range of about 400 (four hundred) to about 20,000 (twenty thousand) centipoises (Ostwald) to obtain an evaporation rate so that the solution and saturated material will form a sandy cohesive mass when mixed, molding the mixture into a block, curing the block and reactivating the cured block.

References Cited in the file of this patent

UNITED STATES PATENTS

| 1,777,998 | Dent et al. | Oct. 7, 1930 |
| 2,288,047 | Sullivan et al. | June 30, 1942 |

FOREIGN PATENTS

| 251,964 | Great Britain | June 9, 1927 |

OTHER REFERENCES

Brochure, "Chemical Loaded Molecular Sieves," 260 Peroyde (a publication by Linde Co., Form No. F–1311).